United States Patent [19]

Kuronishi et al.

[11] Patent Number: 5,228,287

[45] Date of Patent: Jul. 20, 1993

[54] EXHAUST SYSTEM FOR INTERNAL COMBUSTION ENGINE

[75] Inventors: Kiyoshi Kuronishi; Kazunari Komatsu; Naoyuki Noguchi; Hirofumi Nishimura, all of Hiroshima, Japan

[73] Assignee: Mazda Motor Corporation, Hiroshima, Japan

[21] Appl. No.: 906,287

[22] Filed: Jun. 29, 1992

[30] Foreign Application Priority Data

Jun. 28, 1991 [JP] Japan ................... 3-158354

[51] Int. Cl.$^5$ .............................. F01N 3/20
[52] U.S. Cl. ...................... 60/276; 60/277; 60/285; 123/691; 123/692
[58] Field of Search .............. 60/276, 277, 285; 123/691, 692

[56] References Cited

U.S. PATENT DOCUMENTS 5,074,113 12/1991 Matsuoka ................... 60/285

FOREIGN PATENT DOCUMENTS

8332 1/1989 Japan ................... 123/692

*Primary Examiner*—Douglas Hart
*Attorney, Agent, or Firm*—Keck, Main & Cate

[57] ABSTRACT

An exhaust system for an automobile engine having two groups of cylinders has a catalytic device. Deterioration of the catalytic device is detected based on an oxygen level in exhaust gas passed through the catalytic device. A feedback control of an air-fuel ratio is conducted for the cylinder groups all together, based on either of the air-fuel ratios determined, based on emission levels of exhaust gas discharged, for one of two of the groups of cylinders, only when a specific vehicle driving condition is detected.

17 Claims, 6 Drawing Sheets

EXHAUST SYSTEM FOR INTERNAL COMBUSTION ENGINE

BACKGROUND OF THE INVENTION

1. This invention relates to an exhaust system for an internal combustion engine and, more particularly, to an improvement in detecting deterioration in function of a catalytic convertor of an exhaust system.

2. Description of Related Art

An exhaust system for an internal combustion engine typically has a feature for detecting deterioration of a gas purification means, such as a catalytic convertor, disposed in an exhaust system. This kind of exhaust system includes an oxygen sensor for detecting a concentration of oxygen in exhaust gases. A deterioration in function of the catalytic convertor is detected based on the fact that the catalytic convertor lowers emission levels of hydrocarbons (HC) in exhaust gases with an efficiency which is directly proportional to oxygen adsorbability of the catalytic convertor. The oxygen sensor is disposed in an exhaust line downstream from the catalytic converter so as to detect an oxygen level in exhaust gas; this oxygen level is representative of an efficiency of oxygen adsorbability of the catalytic converter, i.e., the degree of deterioration oxygen adsorbability of the catalytic converter. Such an exhaust system is known from, for instance, Japanese Unexamined Patent Publication No. 63-97,852.

Some V-type internal combustion engines have an air-fuel ratio sensor installed in an exhaust line for each group of cylinders in order to perform feedback control of an air-fuel ratio for each cylinder group. For precisely feedback controlling an air-fuel ratio, the V-type internal combustion engine is equipped with an oxygen sensor for detecting a concentration of oxygen in exhaust gases in order to detect deterioration of a catalytic converter installed in the exhaust line. Such a V-type internal combustion engine is known from, for example, Japanese Unexamined Patent Publication No. 61-138,849.

Because the air-fuel ratio feedback control is conducted independently for each of the two cylinder groups, a change in phase of an air-fuel ratio from rich to lean or vice versa occurs randomly between the two cylinder groups, due to differences in exhaust stroke between the cylinder groups, differences in properties and characteristics of various associated elements and sensors between the cylinder groups, and/or circumstances in which exhaust gases are introduced into the catalytic converters installed in the respective exhaust lines. This leads to inaccurate detection of deterioration in function of the catalytic converters.

SUMMARY OF THE INVENTION

It is an object of the present invention to provide an exhaust system for an internal combustion engine in which deterioration of a catalytic device is accurately detected, even though air-fuel ratio feedback control is independently conducted for two of cylinder groups.

According to the present invention, an exhaust gas purification system for an internal combustion engine includes air-fuel ratio sensors respectively disposed in each individual exhaust passage provided for each cylinder group for detecting an air-fuel ratio of exhaust gas, a catalytic device disposed in an integrated exhaust passage provided downstream of and integrating the individual exhaust passages, air-fuel ratio control means for air-fuel ratio feedback control for each cylinder group, based on a signal from each air-fuel ratio sensor, a concentration sensor disposed in the integrated exhaust passage for detecting a concentration of oxygen, and impairment detecting means for detecting impairment of the catalytic device. In order to accurately determine impairment of the catalytic device, control altering means is used to alter air-fuel ratio feedback control from a control for each cylinder group based on each air-fuel ratio sensor to a control for the whole engine based on an exclusive one of the air-fuel ratio sensors. Such an alteration is made when the impairment detecting means detects impairment of the catalytic device.

In accordance with one embodiment of the present invention, the air-fuel ratio feedback control for the whole engine proceeds based on sequential signals from the air-fuel ratio sensor which are exclusively selected in sequence. The impairment detecting means detects impairment of the catalytic device based on an average of all of signals under each air-fuel ratio feedback control for the whole engine.

According to one aspect of the present invention, an exhaust gas purification system includes feedback phase detecting means in lieu of the control altering means. The feedback phase detecting means detects each phase of the air-fuel ratio feedback control for each cylinder group. The impairment detecting means detects impairment of the catalytic device when the feedback phase detecting means detects that the phases coincide with each other.

BRIEF DESCRIPTION OF THE DRAWINGS

The above and other objects and features of the present invention will be apparent to those skilled in the art from the following description of preferred embodiments thereof when considered in conjunction with the drawings, in which.

DETAILED DESCRIPTION OF THE PREFERRED EMBODIMENTS

Because V-type internal combustion engines and their exhaust systems are well known in the art, the present description will be directed to particular elements forming part of, or cooperating directly with, apparatuses in accordance with the present invention. It is to be understood that elements not specifically shown or described may take various forms well known to those skilled in the automobile art.

Figure 1:
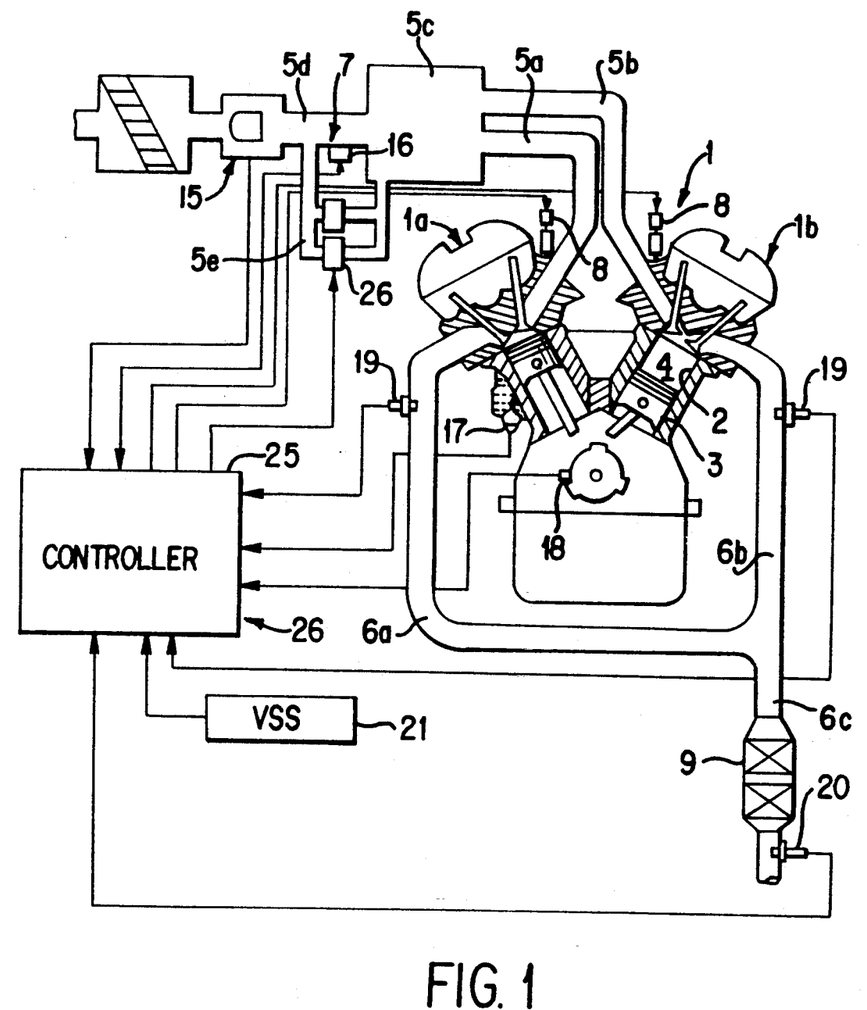
FIG. 1 is a schematic illustration showing an internal combustion engine and an exhaust gas purification system in accordance with a preferred embodiment of the present invention.

Referring to the drawings in detail and, in particular, to FIG. 1, a V-type internal combustion engine having an exhaust system in accordance with a preferred embodiment of the present invention is shown. The engine includes left and right cylinder banks 1a and 1b arranged in a V-formation and at a predetermined relative angle. The left cylinder bank 1a is formed with a row of cylinders 2 in which pistons 3 slide. The right cylinder bank 1b is formed with a row of cylinders 2 in which pistons 3 slide. A combustion chamber 4 is formed in each cylinder 2 having a volume which is variably defined by the piston 3. The left cylinder bank 1a has an intake passage 5a and an exhaust passage 6a attached to it. Similarly, the right cylinder bank 1b an intake passage 5b and an exhaust passage 6b attached to it. The intake passages 5a and 5b are connected to an integrated intake passage 5d through a surge tank 5c. The exhaust passages 6a and 6b are connected to an integrated exhaust passage 6c. The integral intake passage 5d is provided, in order from downstream to upstream portions, with a throttle valve 7 for regulating the flow rate of intake air and an air flow sensor 15 disposed therein upstream from the surge tank 5c. Opening of the throttle valve 7 is detected by a throttle sensor 16.

Integrated intake passage 5d is formed with a bypass passage 5e so as to allow intake air to bypass the throttle valve 7. The bypass passage 5e is provided with an idle speed controller 26 for controlling the quantity of intake air flowing past the throttle valve 7 so as to regulate an engine speed during idling. Fuel injectors 8 are disposed in the intake passages 5a and 5b for the respective cylinders.

Integrated exhaust passage 6c is provided with a catalytic device 9 for lowering emission levels of hydrocarbons (HC) in exhaust gases. Each exhaust passage 6a or 6b is provided with an oxygen (O$_2$) sensor 19, used as an air-fuel ratio sensor; such a sensor may be a zirconia solid electrolytic lambda sensor. The sensor detects emission levels of oxygen in order to determine that an air-fuel ratio of a fuel mixture to be supplied to the combustion chambers 4 is richer or leaner than a specific ratio and feedback control the air-fuel ratio of the fuel mixture. Further, the integrated exhaust passage 6c is provided with an oxygen (O$_2$) sensor 20, which is the same as the oxygen (O$_2$) sensor 19, disposed therein downstream from the catalytic device 9.

Engine 1 is further provided, or associated, with a water temperature sensor 17 for detecting the temperature of cooling water of the engine, an angle sensor 18 for detecting angular rotation of an engine crankshaft (not shown), as an engine speed, and a vehicle speed sensor (VSS) 21.

Signals provided from these sensors 15 to 21 are sent to a control unit 25, having a central processing unit or microcomputer. The control unit 25 controls the fuel injectors 8 on the basis of signals from the air-fuel ratio sensors 19 so as to feedback control an air-fuel ratio of a fuel mixture according to vehicle driving conditions, thereby providing a specific desirable air-fuel ratio of a fuel mixture independently for the respective group of the cylinders 2. The control unit 25 also detects deterioration of the catalytic device 9 on the basis of a signal from the oxygen (O$_2$) sensor 20.

Figure 2:
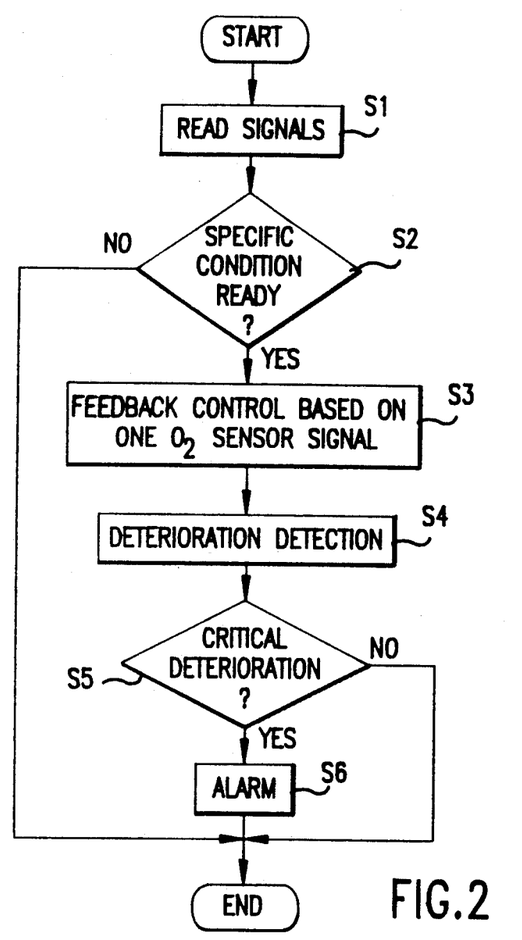
FIGS. 2, 3 and 4 are flow charts illustrating impairment detection control routines for a central processing unit of a controller shown in FIG. 1.
Figure 3:
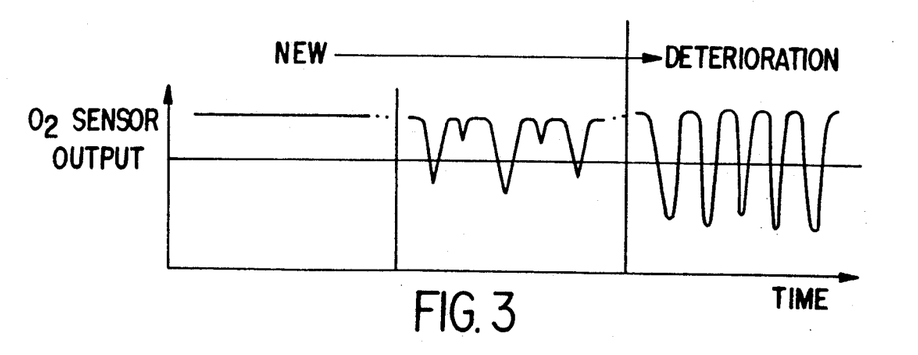
Figure 4:
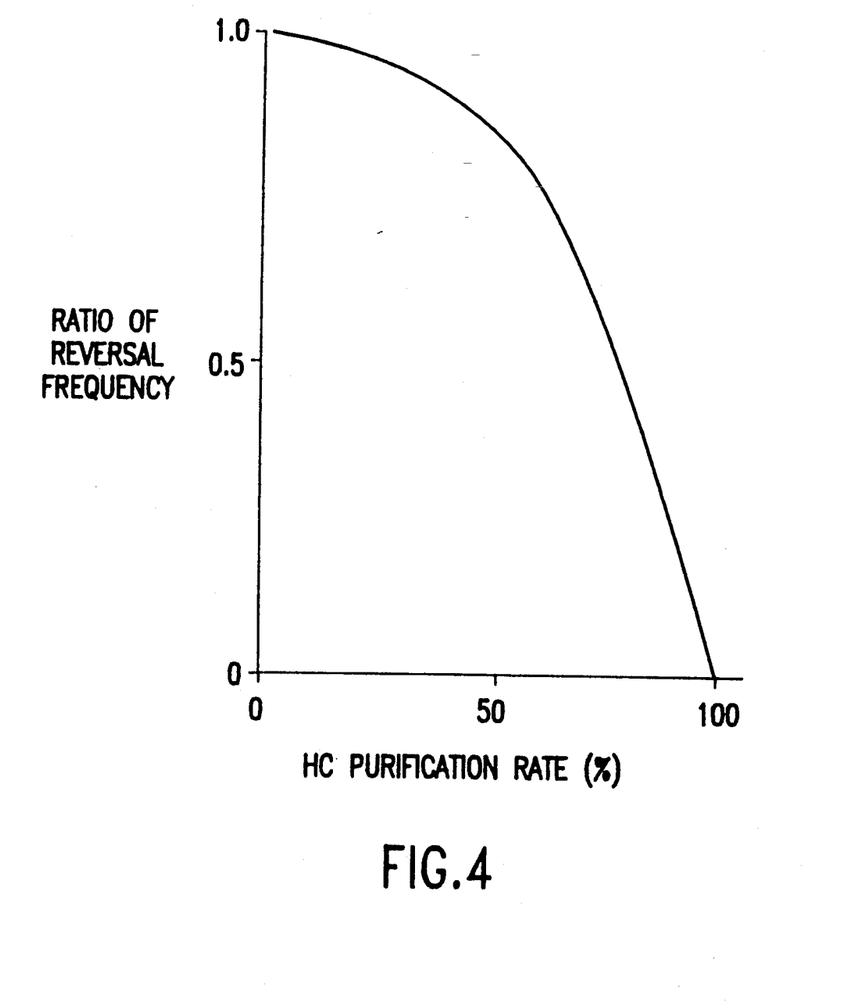

Referring to FIG. 2, which is a flow chart of a deterioration detection routine for the microcomputer for detecting deterioration of the catalytic device 9, after reading various signals at step S1, a decision is made at step S2 as to whether or not a specific condition for detecting deterioration of the catalytic device 9 is completed. The condition is considered to be ready when the temperature of cooling water is higher than a specific temperature, the vehicle speed is within a specific range, and air-fuel ratio feedback control is on-going. If the specific condition is completed, i.e., the answer to the decision made at step S2 is "YES," then, the air-fuel ratio feedback control is executed for all cylinders of both the left and right cylinder banks 1a and 1b, based on a signal from either one of the two oxygen (O$_2$) sensors 19, for instance, the oxygen (O$_2$) sensor 19 in the exhaust line for the cylinders 2 of the left bank 1a, at step S3. Then, in step S4, a signal from the oxygen (O$_2$) sensor 19 in the exhaust line for the cylinders 2 of the left bank 1a is read for an detection of deterioration of the catalytic device 9. This deterioration detection is made based on a frequency of an output signal from the oxygen (O$_2$) sensor 20 or an amplitude of an output signal from the oxygen (O$_2$) sensor 20. As shown as an example in FIG. 3, when the oxygen (O$_2$) sensor 20 provides an output signal having a frequency higher than a predetermined frequency, it is determined that the catalytic device 9 has deteriorated beyond a critical degree. Otherwise, the catalytic device 9 may be determined to have adversely deteriorated beyond the critical degree when a ratio of reversal frequency between the output signal from the oxygen (O$_2$) sensor 19 in the exhaust line for the cylinders 2 of the left bank 1a to the output signal from the oxygen (O$_2$) sensor 20 becomes greater than a critical ratio. The critical ratio depends upon a critical purification rate in percentage of hydrocarbon emissions as shown in FIG. 4. In this case, at step S4, a signal from the oxygen (O$_2$) sensor 20 is read as well as the signal from the oxygen (O$_2$) sensor 19 in the exhaust line for the cylinders 2 of the left bank 1a.

Based on the deterioration detected at step S4, a decision is made at step S5 as to whether or not the catalytic device 9 has adversely deteriorated beyond the critical degree. If the answer to the decision made at step S5 is "YES," then, an alarm lamp is turned on so as to provide an alarm, indicating replacement of the catalytic device 9 is necessary, at step S6. After the alarm, when the answer to the decision made at step S5 is "YES," or directly, when the answer to the decision is "NO," the step orders return.

According to this control, while a critical deterioration of the catalytic device 9 is detected, the air-fuel ratio is controlled, based on one of the two oxygen (O$_2$) sensors 19, commonly for all the cylinders 2 of the engine 1. As a result, there is no difference in phase between changes of air-fuel ratios for the two groups of the cylinders 2, and failure to detect the critical deterioration of the catalytic device 9 is prevented.

Figure 5:
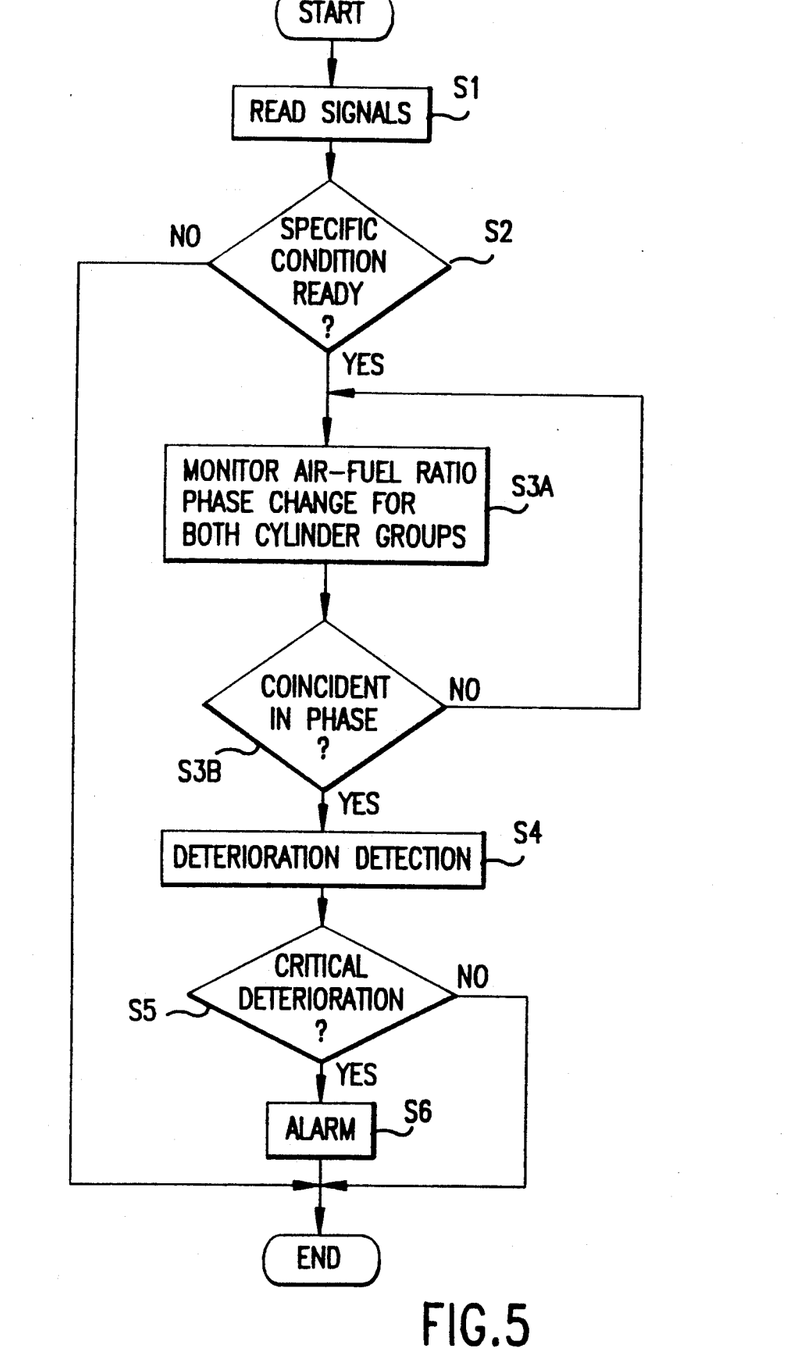
FIG. 5 is an illustration showing patterns of output frequency of a concentration sensor shown in FIG. 1 in accordance with impairment of a catalytic device shown in FIG. 1.

Referring to FIG. 5, a flow chart of another deterioration detection routine for the microcomputer for detecting deterioration of the catalytic device 9 is shown. In this routine, a change in phase of output signals from both the oxygen sensors 19 is constantly monitored. Because all steps except steps for monitoring a change in phase of output signals from both the oxygen sensors 19 are the same as those of the deterioration detection routine shown in FIG. 2, the following description is directed only to those steps which are different from the corresponding step at S3 of the deterioration detection routine shown in FIG. 2.

When the specific condition is established for detecting deterioration of the catalytic device 9 at step S2, signals are read from both the oxygen (O$_2$) sensors 19 so as to monitor a change in phase of an air-fuel ratio for each group of the cylinders 2 at step S3A. Then, a decision is made at step S3B as to whether or not there is a difference in phase between the signals. If answer to the decision made at step 53B is "YES," this indicates that the signals are identical in phase. Then, detection of deterioration of the catalytic device 9 is conducted at step S4. This decision is repeated until the answer to the decision made at step 53B becomes "YES," or until the two signals turn identical in phase.

According to this control, because the detection of deterioration of the catalytic device 9 is not conducted until the feedback control of air-fuel ratio is identical in phase between the groups of cylinders of the cylinder banks 1a and 1b, the detection of deterioration of the catalytic device 9 is accurately performed.

It is to be understood that if air-fuel feedback values are different between the cylinder groups of the left and right banks 1a and 1b, these air-fuel feedback values are changed to the same value at a time the specific condition for conducting a detection of deterioration of the catalytic device is completed.

Figure 6:
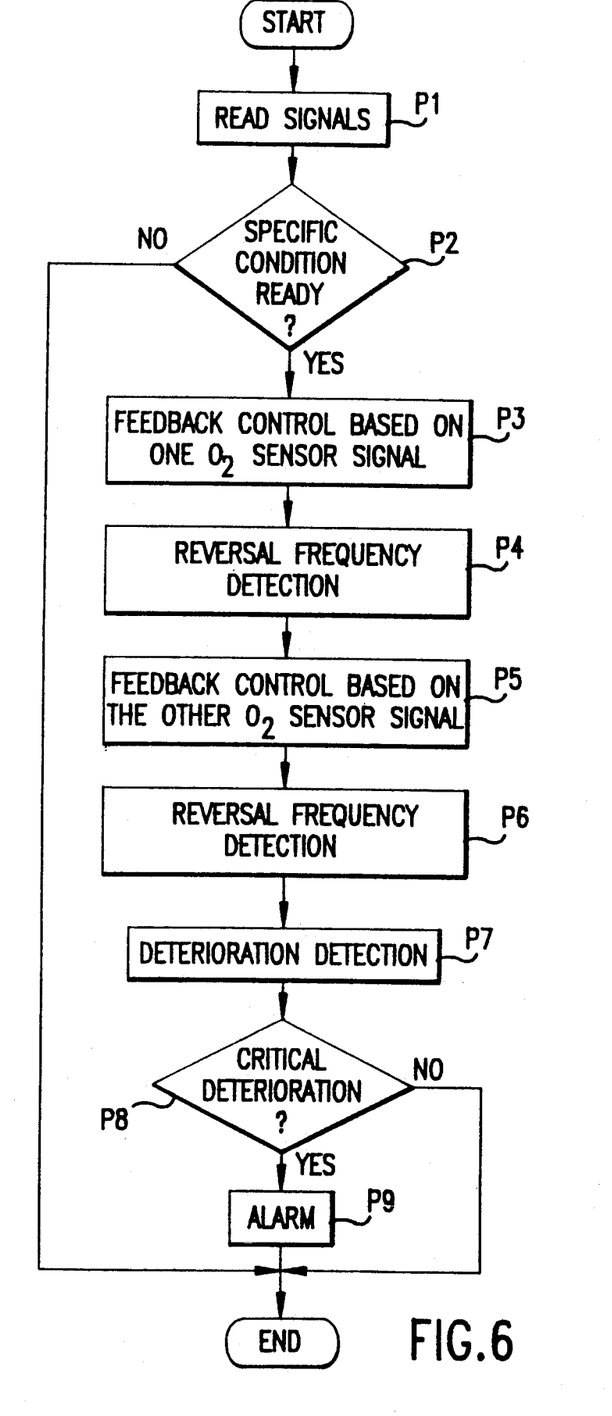
FIG. 6 is a diagram showing a relation between oxygen adsorption capability and a ratio of purification of hydrocarbon of an catalytic device.
Figure 7:
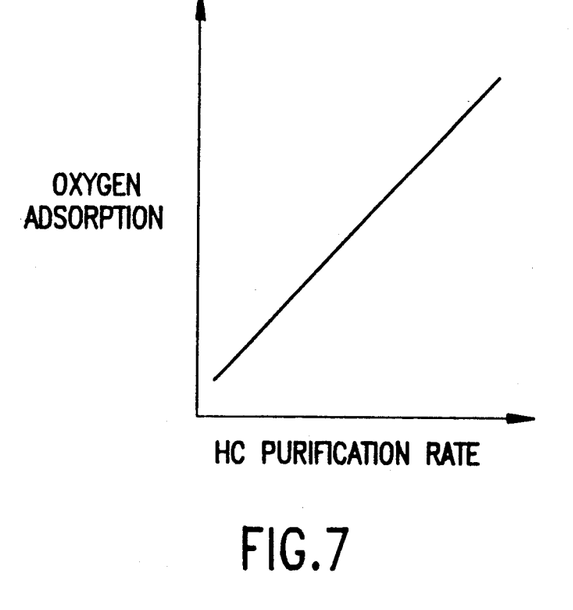
FIG. 7 is a diagram showing a relation between a ratio of the number of times an output signal of the concentration sensor is inverted divided by the number of times a signal for air-fuel ratio sensors is inverted and a ratio of purification of hydrocarbon of an catalytic device.

Referring to FIG. 6, a flow chart of still another routine for detection of deterioration of the catalytic device is shown, in which the determination of adverse deterioration of the catalytic device is made based on reversal frequency of signals from the oxygen (O$_2$) sensors 20.

After reading various signals at step P1, a decision is made at step P2 as to whether or not a specific condition for detecting deterioration of the catalytic device 9 is completed. These steps are made in the same manner as in the previous routines shown in FIGS. 2 and 5. Then, if the specific condition is completed, an air-fuel ratio feedback control is conducted based on a signal from one of the oxygen sensors 19, for instance, that for the cylinder group of the left cylinder bank 1a, for all the cylinders 2 for a predetermined period at step P3.

While the air-fuel ratio feedback control takes place commonly to all the cylinders 2, a reversal frequency of a signal from the oxygen (O$_2$) sensor 20 is detected at step P4. Thereafter, an air-fuel ratio feedback control is conducted based on a signal from the other of the oxygen sensors 19 for the cylinder group of the right cylinder bank 1b for all the cylinders 2 for a predetermined period at step P5 and subsequently, a reversal frequency of a signal from the oxygen (O$_2$) sensor 20, while the air-fuel ratio feedback control takes place commonly to all the cylinders 2, is detected at step P6.

At step P7, an average reversal frequency of the reversal frequencies of the signal from the oxygen (O$_2$) sensor 20 obtained at steps P4 and P6 is calculated so as to determine the degree of deterioration of the catalytic device 9 at step S7. Further, at step P8, a decision is made based on the average reversal frequency as to whether or not the catalytic device 9 has adversely deteriorated beyond the critical degree. This decision is made by monitoring whether or not the average reversal frequency is beyond a predetermined critical reversal frequency. If the answer to the decision is "YES," then, an alarm lamp is turned on so as to provide an alarm for replacement of the catalytic device 9 at step P9. After the alarm when the answer to the decision made at step P8 is "YES," or directly when the answer to the decision is "NO," the step orders return.

Because the individual exhaust passages 6a and 6b for the two groups of the cylinder 2 of the left and right cylinder banks 1a and 1b differ in length, as shown in FIG. 1, there may be a small difference in phase between changes in air-fuel ratio of the two groups of the cylinders 2, even when an air-fuel ratios control is conducted commonly for all of the cylinders 2. Because the determination of deterioration of the catalytic device 9 is made based on an average reversal frequency of two reversal frequencies of a signal from the oxygen sensor 20 obtained when the oxygen sensors 19 are selectively used to conduct an air-fuel ratio feedback control, one after another in sequence, the detection of adverse deterioration of the catalytic device 9 is precisely made even if there is a difference in phase between changes in air-fuel ratio for the two groups of the cylinders 2.

It is to be understood that although the present invention has been described in detail with respect to preferred embodiments thereof, various other embodiments and variants may occur to those skilled in the art. Any such embodiments and variants which fall within the scope and spirit of the invention are intended to be covered by the following claims.

What is claimed is:

1. An exhaust system for an internal combustion engine having a plurality of cylinders divided into two groups, which are independently connected to exhaust lines comprising an individual exhaust passage and a common exhaust passage, said exhaust system comprising:
   air-fuel ratio detecting means, disposed in each individual exhaust passage, for detecting an air-fuel ratio based on an emission level of exhaust gas;
   catalytic convertor means, disposed in said common exhaust passage, for purifying exhaust gas;
   an oxygen sensor, disposed in said common exhaust passage downstream from said catalytic convertor means, for detecting an oxygen level of exhaust gas passed through said catalytic convertor means; and
   control means for feedback controlling air-fuel ratios for said cylinder groups independently based on emission levels detected by said air-fuel ratio detecting means, respectively, for detecting vehicle driving conditions, for feedback controlling an air-fuel ratio for said cylinder groups all together based on either one of the air-fuel ratios only when detecting a specific vehicle driving condition, and for detecting deterioration of said catalytic convertor means based on a signal representative of an oxygen level detected by said oxygen sensor while an air-fuel ratio is feedback controlled for said cylinder groups all together based on said one of said air-fuel ratios, thereby determining a critical deterioration of said catalytic convertor means.

2. An exhaust system as defined in claim 1, wherein said control means detects a reversal frequency of said signal provided from said oxygen sensor based on which a degree of deterioration of said catalytic convertor means is determined.

3. An exhaust system as defined in claim 1, wherein said control means detects a reversal frequency of said signal provided from said oxygen sensor and a reversal frequency of a signal representative of an emission level detected by one of said air-fuel detecting means, and determines deterioration of said catalytic convertor means based on a ratio between the reversal frequencies of said signals representative of an oxygen level and an emission level.

4. An exhaust system as defined in claim 1, wherein said oxygen sensor comprises a zirconia solid electrolytic lambda sensor.

5. An exhaust system as defined in claim 1, wherein said air-fuel ratio detecting means comprises an oxygen sensor for detecting an exhaust gas oxygen level.

6. An exhaust system as defined in claim 5, wherein said oxygen sensor comprises a zirconia solid electrolytic lambda sensor.

7. An exhaust system as defined for an internal combustion engine having a plurality of cylinders divided into two groups, which are independently connected to exhaust lines comprising an individual exhaust passage and a common exhaust passage, said exhaust system comprising:

air-fuel ratio detecting means, disposed in each individual exhaust passage, for detecting an air-fuel ratio based on an emission level of exhaust gas;

catalytic convertor means, disposed in said common exhaust passage, for purifying exhaust gas;

an oxygen sensor, disposed in said common exhaust passage downstream from said catalytic convertor means, for detecting an oxygen level of exhaust gas passed through said catalytic convertor means; and control means for feedback controlling air-fuel ratios for both said cylinder groups independently based on emission levels detected by said air-fuel ratio detecting means, respectively, for detecting vehicle driving conditions, for monitoring a difference between phases in change of air-fuel ratios for both said groups of said cylinders based on an emission level of exhaust gas detected by said air-fuel ratio detecting means only when detecting a specific vehicle driving condition, and for detecting deterioration of said catalytic convertor means based on a signal representative of an oxygen level detected by said oxygen sensor only when detecting no difference between said phases, thereby determining a critical deterioration of said catalytic convertor means.

8. An exhaust system as defined in claim 7, wherein said control means further conducts a feedback control of air-fuel ratio for said cylinder groups all together based on either one of said air-fuel ratios while detecting deterioration of said catalytic convertor means.

9. An exhaust system as defined in claim 7, wherein said control means detects a reversal frequency of said signal provided from said oxygen sensor based on which a degree of deterioration of said catalytic convertor means is determined.

10. An exhaust system as defined in claim 7, wherein said control means detects a reversal frequency of said signal provided from said oxygen sensor and a reversal frequency of a signal representative of a emission level detected by one of said air-fuel detecting means, and determines deterioration of said catalytic convertor means based on a ratio between the reversal frequencies of said signals representative of an oxygen level and an emission level.

11. An exhaust system as defined in claim 7, wherein said oxygen sensor comprises a zirconia solid electrolytic lambda sensor.

12. An exhaust system as defined in claim 7, wherein said air-fuel ratio detecting means comprises an oxygen sensor for detecting an oxygen level of exhaust gas.

13. An exhaust system as defined in claim 12, wherein said oxygen sensor comprises a zirconia solid electrolytic lambda sensor.

14. An exhaust system as defined for an internal combustion engine having a plurality of cylinders divided into two groups, which are independently connected to exhaust lines comprising an individual exhaust passage and a common exhaust passage, said exhaust system comprising:

air-fuel ratio detecting means, disposed in each individual exhaust passage, for detecting an air-fuel ratio based on an emission level of exhaust gas;

catalytic convertor means, disposed in said common exhaust passage, for purifying exhaust gas;

an oxygen sensor, disposed in said common exhaust passage downstream from said catalytic convertor means, for detecting an oxygen level of exhaust gas passed through said catalytic convertor means; and control means for feedback controlling air-fuel ratios for said cylinder groups independently based on emission levels detected by said air-fuel ratio detecting means, respectively, for detecting vehicle driving conditions, for conducting a feedback control of an air-fuel ratio for both said cylinder groups based on either one of said air-fuel ratios for a predetermined period only when detecting a specific vehicle driving condition, for detecting a reversal frequency of a signal representative of an oxygen level detected by said oxygen sensor during said feedback control of an air-fuel ratio for both said cylinder groups based on said one of said air-fuel ratios for a predetermined period, for conducting a feedback control of an air-fuel ratio for both said cylinder groups based on the other one of said air-fuel ratios for said predetermined period only when detecting a specific vehicle driving condition, for detecting a reversal frequency of a signal representative of an oxygen level detected by said oxygen sensor during said feedback control of an air-fuel ratio for both said cylinder groups based on said the other one of said air-fuel ratios for a predetermined period, and for detecting deterioration of said catalytic convertor means based on an average reversal frequency of said reversal frequencies, thereby determining a critical deterioration of said catalytic convertor means.

15. An exhaust system as defined in claim 14, wherein said oxygen sensor comprises a zirconia solid electrolytic lambda sensor.

16. An exhaust system as defined in claim 15, wherein said air-fuel ratio detecting means comprises an oxygen sensor for detecting an oxygen level of exhaust gas.

17. An exhaust system as defined in claim 16, wherein said oxygen sensor comprises a zirconia solid electrolytic lambda sensor.

* * * * *